United States Patent [19]

Price et al.

[11] 4,219,408

[45] * Aug. 26, 1980

[54] MAGNETIC SEPARATION OF MINERALS UTILIZING MAGNETIC PARTICULATES

[75] Inventors: William M. Price, St. Austell, England; Alan J. Nott, Huelgoat, France

[73] Assignee: Anglo-American Clays Corporation, Sandersville, Ga.

[ * ] Notice: The portion of the term of this patent subsequent to May 2, 1995, has been disclaimed.

[21] Appl. No.: 900,809

[22] Filed: Apr. 27, 1978

Related U.S. Application Data

[63] Continuation-in-part of Ser. No. 618,347, Oct. 1, 1975, Pat. No. 4,087,004, Ser. No. 753,201, Dec. 22, 1976, Pat. No. 4,125,460, and Ser. No. 856,267, Dec. 1, 1977.

[51] Int. Cl.$^2$ .......................... B03B 1/04; B03C 1/00
[52] U.S. Cl. .......................................... 209/5; 209/39; 209/214
[58] Field of Search .................... 209/3, 4, 5, 9, 8, 39, 209/214

[56] References Cited

U.S. PATENT DOCUMENTS

| | | | |
|---|---|---|---|
| Re. 14,583 | 1/1919 | Schwerin | 209/5 |
| 933,717 | 9/1909 | Lockwood | 209/9 |
| 1,043,850 | 11/1912 | Lockwood | 209/47 X |
| 1,063,893 | 6/1913 | Schwerin | 209/5 X |
| 1,823,852 | 9/1931 | Brondus | 209/9 X |
| 3,451,545 | 6/1969 | Studer | 209/8 |
| 3,676,337 | 3/1972 | Kolm | 210/222 X |
| 3,826,365 | 7/1974 | Mercade | 209/5 |
| 3,843,540 | 10/1974 | Reimens | 252/62.56 X |
| 3,926,789 | 12/1975 | Shubert | 209/8 |
| 3,928,709 | 12/1975 | Audron | 252/62.56 |
| 3,929,627 | 12/1975 | Frangiskus | 209/9 |
| 4,087,004 | 5/1978 | Nott | 209/214 X |

FOREIGN PATENT DOCUMENTS 535105 11/1976 U.S.S.R. .................................. 209/39

OTHER PUBLICATIONS

Phys. Rev., Elmore, 309,310, 1938.
Journal of Applied Physics, Suppl. vol. B2, No. 3, Mar. 1963, 2355, 2365.

Primary Examiner—Robert Halper
Attorney, Agent, or Firm—Weingram & Klauber

[57] ABSTRACT

A method for magnetically beneficiating an ore by removing therefrom undesired metallic minerals of inherently low magnetic attractability. An aqueous dispersed slurry of the ore is formed, and the slurry is mixed with a system of transiently suspended ferrimagnetic particles of predominantly colloidal size. The particles are further characterized by an isoelectric point in relation to the mineral sought to be removed, such that the particles spontaneously co-flocculate with the mineral to seed same. The resultant seeded slurry is passed through a porous ferromagnetic matrix in the presence of a magnetic field, which separates the seeded mineral at the matrix, with the purified ore emerging from the matrix being recovered as product. This beneficiated product, i.e. now relatively free of the undesired species, can then (as appropriate) be further processed.

10 Claims, 2 Drawing Figures

0.1μ

MAGNETIC SEPARATION OF MINERALS UTILIZING MAGNETIC PARTICULATES

BACKGROUND OF INVENTION

This application is a continuation-in-part of our copending applications Ser. No. 618,347, filed Oct. 1, 1975, now U.S. Pat. No. 4,087,004, and Ser. No. 753,201, filed Dec. 22, 1976, now U.S. Pat. No. 4,125,460 each being entitled "MAGNETIC BENEFICIATION OF CLAYS UTILIZING MAGNETIC PARTICULATES", and of our copending application Ser. No. 856,267, filed Dec. 1, 1977 and entitled "METHOD FOR SEPARATING METALLIC MINERALS UTILIZING MAGNETIC SEEDING". Each of the said applications is assigned to the same assignee as is the instant application.

This invention relates generally to methods for beneficiation of minerals, and more specifically relates to a method for separating a metallic mineral of inherently low magnetic attractability from an ore in which the mineral is present as an undesired species, and thereupon recovering the purified ore as product.

In the first two of our aforementioned copending applications we have disclosed and claimed methods which are especially useful in improving the brightness of minerals such as kaolin clays, through the use of magnetic separation. In these instances a primary area of interest has thus been one of beneficiating the said kaolin clays by removing titanium-based impurities, such a iron-stained anatase and rutile.

In our cited applications we thus report our findings that the said contaminants may be removed with a surprisingly unexpected degree of success, by a method wherein a dispersed aqueous slurry of the crude clay is admixed with a magnetic particulate, which particulate is thereby dispersed throughout the slurry so as to effectively seed same. Thereupon the seeded slurry is subjected to a magnetic separation, as for example, by passing same through apparatus of the type disclosed in Marston, U.S. Pat. No. 3,627,678, whereby the contaminants seeded by the particulate are separated from the slurry—along with excess particulate (i.e. particulate not physically associated with contaminants), and additional unseeded contaminants.

As is reported in our earlier applications, a preferable magnetic seeding particulate for use with the processes disclosed, may comprise a particulate of ferroso-ferric oxide, wherein at least 50% by weight of the particles are of submicron size, which particulate is prepared as the product of aqueous coprecipitation of iron (III) with iron (II) salts by an excess of a relatively strong base. Other finely divided ferrimagnetic materials are also useful for seeding purposes, in accordance with the present invention, including cubic ferrites such as $NiFe_2O_4$ and $CoFe_2O_4$; gamma ferric oxide, and more generally the magnetic ferrites represented by the general formula $MO.Fe_2O_3$, where M is a divalent metal ion such as Mn, Ni, Fe, Co, Mg, etc.

In the second of our aforementioned applications, we also report that the performance levels of magnetic separating apparatus are so vastly augmented by the techniques described, that the magnetic field to which the slurry is subjected may in the practice of the invention be dropped to at least as low as 0.5 Kg—and yet provide effective results. Such result is completely unexpected in view of the art prior to our invention—which teaches that acceptable brightening of the clay minerals is attainable only at intensities in the range from about 12 to 15 Kg or higher.

It may be noted in the foregoing connection that over the course of many years, numerous investigators have proposed, and in some instances utilized processes wherein a constituent of low magnetic attractability present in a mineral mixture, is in some manner modified to increase the magnetic attractability thereof. Numerous prior proposals have thus considered the concept of introducing powdered magnetite, or ferrosilicon or the like into a slurried mineral, and adhering the introduced magnetic particles to the mineral component sought to be removed. In virtually all instances wherein such techniques have been proposed, the introduced materials have been of relatively coarse size—typically, for example, the magnetite thus introduced is of the order of 50 microns or so. Many prior approaches to this problem have contemplated use of an intermediate chemical agent to effect adhesion. In some instances, for example, organic or inorganic oils are used to effectively wet one or the other of the materials to be adhered. See in this connection, for example, Hubler, U.S. Pat. No. 2,352,324.

A further patent of interest is Shubert, U.S. Pat. No. 3,926,789, which teaches the use of a specific type of material, namely, ferrofluids, to selectively wet the mineral particles sought to be thereafter magnetically removed. In this instance the ferrofluids, which are described in Shubert as being ultra-stable colloidal suspensions, usually employ an organic carrier such as kerosene. This approach, while useful in many instances, introduces undesired chemical species into the slurry, especially the organic carriers, which thereafter must be eliminated from the processing plant effluent. The use of such techniques, as is also set forth in Shubert (by virtue of the ferrofluids used), frequently requires emulsification steps. Further the techniques contemplated in Shubert require modification of the surface of the mineral particles sought to be removed, to enable the aforementioned wetting action.

These prior art approaches are actually strikingly similar to flotation techniques. In the latter a flotation agent is used which selectively coats the mineral to be removed. Whereas in flotation air bubbles are attached to the coated contaminant which is then removed as a froth, in the above art magnetite takes the place of the air bubbles and is attached by a similar mechanism, and the magnetite/contaminant is removed magnetically rather than gravimetrically.

SUMMARY OF INVENTION

Now in accordance with the present invention, it has unexpectedly been found that an undesired metallic mineral of inherently low magnetic attractability may be efficiently separated from the ore containing the mineral, by a process wherein a dispersed aqueous slurry of the ore is admixed with a system of transiently suspended i.e. unstabily suspended ferrimagnetic particles of predominantly colloidal size, which particles are further characterized by an isoelectric point in relation to the slurried mineral sought to be separated, such that the particles spontaneously co-flocculate with the undesired mineral to seed same. Thereafter the resulting seeded slurry is passed through a porous ferromagnetic matrix in the presence of a magnetic field, which separates the seeded mineral at the matrix. The purified or beneficiated ore emerges from the matrix, whence it is recovered as product.

This beneficiated product, i.e. now relatively free of the undesired species, can then (as appropriate) be further processed. In some instances the further processing may be directed at recovering metallic content of the beneficiated ore; in other instances the ore may be used more directly, i.e. as in the case of an "industrial mineral".

For efficient removal the seeding particles should preferably display an isoelectric point within 2.0 units of that of the mineral sought to be removed. Preferably, further, the pH in the seeded slurry is between the isoelectric points of the ferrimagnetic seeding particles and the metallic mineral, as this increases the coulombic attraction between the two.

A preferable particulate for the use with the process of the invention may comprise the previously mentioned particulate of ferroso-ferric oxide particles wherein at least 50% by weight of the particles are of sub-micron (i.e. colloidal) size, which particulate is prepared as a product of aqueous coprecipitation of an iron (III) with iron (II) salt by an excess of a relatively strong base.

More generally a particulate comprising a magnetic ferrite of the general formula $MO.Fe_2O_3$, where M is a divalent metal ion, may be used, where the said particulate is again preferably added to the slurry as one which is the product of aqueous coprecipitation of an iron (III) salt with the salt of the divalent metal in the presence of an excess of strong base. Reference may be had in this connection to the paper by W. J. Schuele et al, entitled "Preparation, Growth and Study of Ultrafine Ferrite Particles", *"Journal of Applied Physics"*, Supplement to Vol. 32, No. 3 (March, 1961), which e.g. describes preparation of particulates of this type comprising $NiFe_2O_4$ and $CoFe_2O_4$. The corresponding magnesium and manganese compounds may be similarly used after being prepared as described. Where the Schuele et al method is thus used, it will be understood that the resultant aqueous precipitates are preferably utilized in the present invention without stabilizing same by peptization or the like.

The aforementioned particulates are not in any sense true ferrofluids. Indeed by indicating same as being "transiently" or "unstably" suspended, it is meant to imply that the said particulates will, after a limited period, settle out—as would any suspension lacking stabilization. The absence of stabilization is indeed believed to yield advantages in the present process, in that the presence of dispersing agents interfere with the desired co-flocculation of the seeding particles with the metallic mineral.

Various apparatus may be utilized to thereafter effect the aforementioned magnetic separation, including the apparatus disclosed in Marston U.S. Pat. No. 3,627,678. In this instance the slurry is passed through a canister which contains a stainless steel or similar filamentary (porous) ferromagnetic matrix, while a high intensity magnetic field is impressed on the matrix, by enveloping coils.

Contrary to the Marston teaching however, and in accordance with aspects of the invention cited in our aforementioned copending Ser. Nos. 618,347 and 753,201 applications, the performance levels of the magnetic separating apparatus are so vastly augmented by the present techniques, that one may elect to tradeoff flow rates through a given apparatus (and thereby retention time in the field) against field intensities to an extent heretofore not deemed practical. Thus the magnetic field to which the slurry is subjected in the practice of the present invention may be dropped to at least as low as 0.5 kG, and yet provide acceptable separation of the seeded mineral.

In general retention times are adjusted to the field intensities utilized. For example, at a field intensity of 5 kilogauss use of the invention with the aforementioned Marston-type of apparatus yields an acceptable mineral separation with retention times as low as 15 seconds. The present invention indeed makes possible "tradeoffs" in retention time vis-a-vis field intensity to a degree heretofore unknown in the art. The aforementioned Marston-type of apparatus is designed for (and has in the past been operated) at about 15 to 22 kilogauss. With these last levels of field intensities typical retention times in the practice of the present invention are of the order of 15 to 80 seconds. Within the limits of the technology (and of economics), higher fields may also be used with the invention, e.g. up to 60 kilogauss, or higher.

The concept of an isoelectric point is one that is well known, especially in the art pertinent to colloids. Thus for typical materials, such as the inorganic oxides which are among the chief metallic minerals sought to be separated by the present techniques, it is known that particles thereof dispersed in a liquid phase have a net surface charge, which can be acquired by a number of different mechanisms, including adsorption of protons or hydroxyl ions from solution onto the particle surface, or by surface disassociation. In addition anions, cations or surfactants present may be adsorbed from the solution to result in a surface charge of the same sign as the adsorbed species.

The aforementioned surface charge is known to vary with the pH of the aqueous solution. Thus in acid conditions protons are adsorbed at the surface to yield positive charge; and in alkaline conditions hydroxyl ions are adsorbed to yield a negative charge. That pH at which the net charge on the surface is zero in the absence of specific adsorbed ions is referred to as the isoelectric point. This point of zero surface charge is also frequently referred to as the zero point of charge (ZPC). In these terms one can generalize the phenomenon by indicating that above the ZPC the suspended particles have a negative surface charge; and below the ZPC they display a positive surface charge.

In accordance with the present invention it is hypothesized that the mechanism instrumental in achieving the new results is one wherein the net surface charge of the particles sought to be co-flocculated are each reduced to zero; or to levels and polarities such that the two surfaces have potentials close to one another; or preferably, at opposite polarities, to thereby provide actual coulombic attraction between the said surfaces. This latter result may thus be obtained by providing pH conditions in the slurry which lie between the isoelectric points of the species sought to be coupled. See in this connection deLatour and Kolm, "Magnetic Separation in Water Pollution Control-II", *IEEE Transactions on Magnetics,* Vol. Mag-11 No. 5, September 1975.

In the foregoing sense the mechanism of the invention may perhaps be better appreciated by considering that in a colloidal state, at least, it is the "normal" presence of mutually repellant charge on the suspended particles which maintain the said colloidal state. From the mentioned colloidal state, coagulation or precipitation is often effected by adjusting the pH to a point where the maintaining charge between particles is dissipated.

By analogy in the present environment, one admixes the seeding particles and metallic mineral ore, and if necessary adjusts the pH to remove those conditions which "normally" prevent co-flocculation, or even augments the co-flocculating conditions by inducing respective charge of opposed polarities on the species to be co-flocculated.

The preferred seeding material of the present invention, i.e. the synthesized ferroso-ferric oxide particulate aforementioned, has an isoelectric point of approximately 6.5, which lies very close to that of typical metallic minerals sought to be separated, including, for example, $TiO_2$ at an isoelectric point of 6.2, SnO with an isoelectric point of 7.3, $ZnO_2$ at 6.05, etc. See more generally papers such as G. A. Parks "The Isoelectric Points of Solid Oxides, Solid Hydroxides, and Aqueous Hydroxo Complex Systems", *Chemical Reviewers*, 65, 177 (1965). Hence the mechanism of the invention is readily instrumented in these practical instances.

It will be further appreciated that once the seeded mineral is separated at the aforementioned matrix from the ore—which emerges from the matrix as product—the magnetic field maintained at the matrix may be extinguished, and the matrix then periodically flushed, as with water, to recondition the matrix for further use.

DESCRIPTION OF PREFERRED EMBODIMENT

Figure 1:
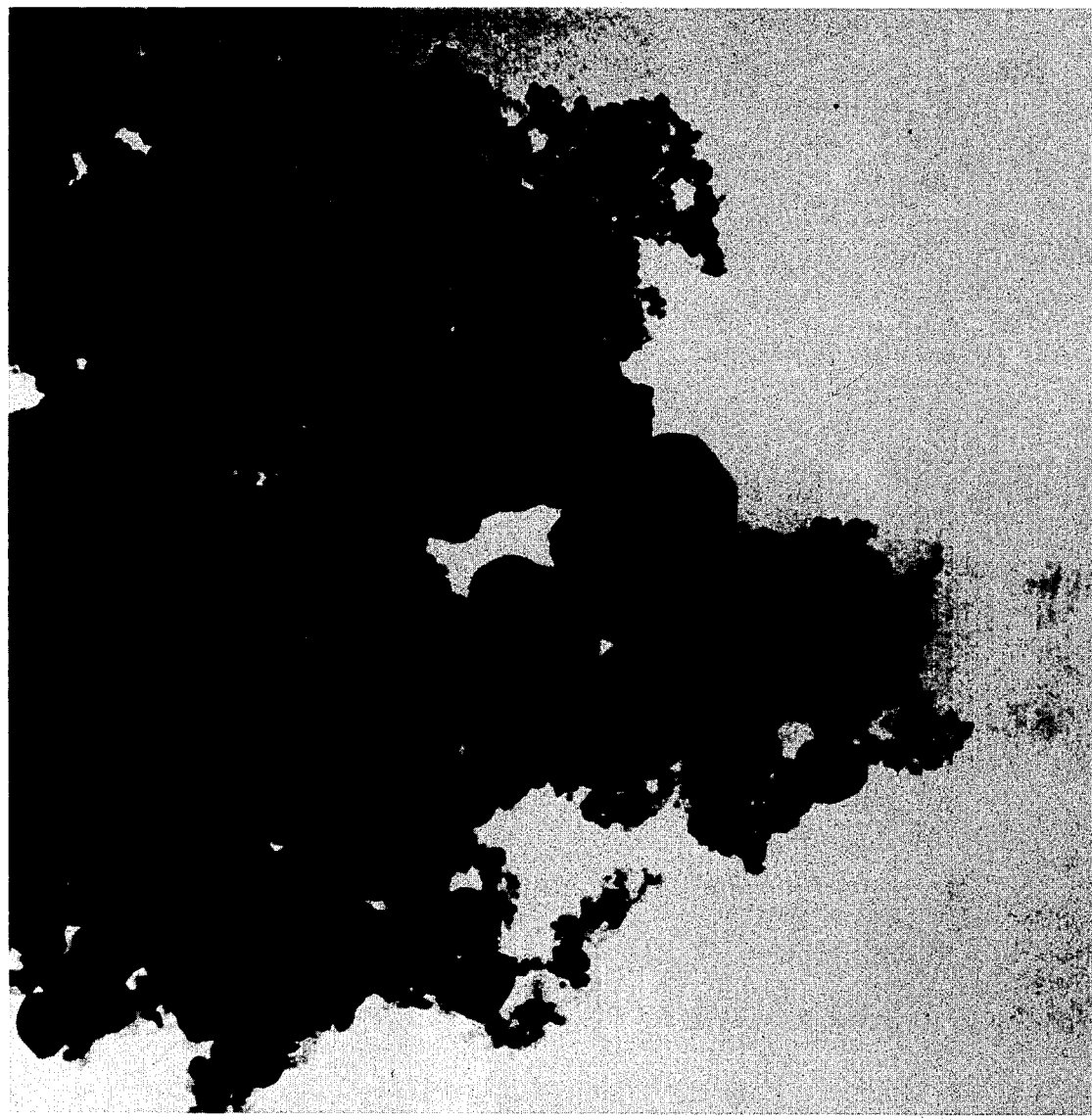
FIGS. 1 and 2 are each electron photo micrographs of a coflocculated metal oxide and seeding particulate separated from a slurried mineral ore pursuant to the present invention.

A preferred magnetic seeding particulate for use in the processes of the present invention is a synthesized ferroso-ferric oxide which is prepared by coprecipitating iron (III) and iron (II) ions from an aqueous solution in a desired molar ratio, by neutralization with an excess of a relatively strong base, such as ammonium or sodium hydroxide. The particle sizes and size distribution of the resultant particulate varies somewhat according to the specifics of the reaction conditions; but in general the particulate has a size distribution such that at least 50% by weight of the particles have an equivalent diameter less than 1 micron—as determined by electron microscopy. Indeed the ultimate particle size of the ferroso-ferric oxide is of the order of 100 Å.

The cited reaction results in an intense black colored ferrimagnetic precipitate. The precipitate, as thus far described, is suspended in the aqueous carrier and thus defines an aqueous particulate. Since such particulate is unpeptized, it is physically unstable, i.e. it will gradually settle if permitted to stand. The molar proportions of the two iron species can be mixed to yield products of varying magnetic saturation values. In a preferred compositional range the ferroso-ferric oxide thus prepared, will have an iron (III) to iron (II) ratio from about 1 to 2.5; with a yet more optimal range having a ratio of from about 1.5 to 2.0.

EXAMPLE I

A magnetic seeding particulate for use in the processes of the invention, was prepared by weighing 12.8 g of $FeCl_2 \cdot 4H_2O$ and 18.6 g of $FeCl_3$ (anhydrous in a 400 ml flask). 200 ml of deionized water were added, with good stirring. With vigorous stirring 61.2 ml of $NH_4OH$ (28% solution) were thereupon added. This yielded approximately 264 ml of magnetic seeding particulate "solution". Dose rates in many of the following Examples are expressed in ml of such an aqueous magnetic particulate added to a clay slurry containing 4 lb. dry weight of clay. For example, a dose rate of 100 ml/4 lb. clay corresponds to 50 liters/ton or 13.2 U.S. gallons/ton. If it is assumed that all the iron in the salt solution is converted to $Fe_3O_4$, then 264 ml of the aqueous magnetic particulate will contain 13.2 g $Fe_3O_4$. Therefore a dose rate of 100 ml/4 lb. clay will correspond to 5.0 g/4 lbs. clay, to 2.5 Kg $Fe_3O_4$ per ton of clay, or 4.5 lbs. $Fe_3O_4$ per ton of clay.

EXAMPLES II THROUGH IV

In the series of Examples hereinbelow set forth, the methodology of the present invention was practiced upon a series of kaolin clay samples which naturally incorporated contaminating quantities of titania. Highly effective titania separation was yielded by use of imposed magnetic fields as low as 0.5 Kg.

In all of these Examples, the magnetic seeding particulate utilized was prepared as described in Example I. The seeding particulate used was thus an aqueous, unpeptized suspension which could be regarded as physically "unstable" in the sense that the particulate would tend to settle out from the aqueous carrier and/or change size characteristics over an extended period.

Three different types of kaolin clay samples were used in these Examples, hereinafter identified as clays "E", "F" and "G". Clay "F" was a relatively coarse, soft cream Georgia kaolin with 1.68% $TiO_2$ content; clay "G" was a relatively fine, soft, cream Georgia kaolin with 1.33% $TiO_2$; clay "E" was a blend of coarse and fine, soft, cream Georgia kaolins and included 1.66% $TiO_2$.

In all instances in these Examples, approximately 5 lbs. of the crude clay (4 lbs. dry weight), was initially blunged at 60% solids with the required amount of dispersant.

The clay samples following blunging were conditioned for 15 minutes using high speed mixing. The approximate work input during this step was about 50 hp-hr/ton of dry clay—with 30 to 60 hp-hr/ton being a preferred range of operation. At this point the seeding particulate was added to the samples at the specific concentration levels found to be relatively optimum, and mixing was then continued for approximately 1 minute. It may be noted in this connection that it has been found that the seeding particulate is indeed preferably added subsequent to the dissipation of approximately 30 to 60 hp-hrs/ton solids of work. The further conditioning in the presence of the seeding particulate, preferably is conducted for approximately 30 to 90 seconds.

Following dispersion of the seeding particulate, the seeded slurry samples are diluted to a level of 20 to 30% solids, and this slurry is passed through magnetic separating apparatus of the Marston or similar type—i.e. preferably through a porous ferromagnetic matrix maintained in an applied magnetic field. The matrix used comprised a stainless steel wool at a 7% packing (sometimes indicated hereinbelow as "7% v/v". By this it is meant that 7% of the separator canister volume was effectively occupied by the matrix material. A given volume of the "magnetted" slurry was in all instances caught for further analysis. This was flocced with H₂SO₄, filtered and dried, and the TiO₂ content measured.

The major variables in the Examples were variation in the intensity of the applied magnetic field—typical variations ran from 0.64 kG to 18.2 kG; variation in retention time in the field; and variation in slurry solids, usually running from 20 to 30% solids.

Dispersant and magnetic particulate concentration data for the three clay types "E", "F", and "G" processed in these Examples, are set forth in Table I below, where all data is referenced to additional levels per 4 lbs. of dry clay. The concentration levels (or "dose rates") for the magnetic particulates may be converted to kG of $Fe_3O_4$ per ton of clay, as in Example I. It will be evident that the TiO₂ is being separated in highly effective fashion.

Table I

| | Dispersant | Particulate Concentration |
|---|---|---|
| Clay E | 100 ml sodium silicate solution (4% w/w) 10 ml NH₄OH (26° Baume) | 40 ml/4# dry clay |
| Clay F | 0.5g sodium hexametaphosphate (dry) 0.5g Nalco 5WM410 (as received) 15 ml NH₄OH (26° Baume) | 50 ml/4# dry clay |
| Clay G | 0.6g sodium hexametaphosphate (dry) 0.6 Nalco 5WM410 ( a sodium polyacrylate, used as received) 15 ml NH₄OH (26° Baume) | 40 ml/4# dry clay |

Table II

In Table II hereinbelow, data is set forth with respect to the aforementioned Clay E samples which have been processed in accordance with the procedure just described. More specifically sample E (initial TiO₂ content 1.66%) with addition of the seeding particulate of the invention, is seen to be subjected to magnetic separation under various magnetic field intensity conditions, and for two differing volumes of slurry collection—i.e. for 800 ml of collection, and for 3200 ml of collection. The canister utilized in obtaining the data in Table II had an effective volume of 725 cm³, whereby the 3200 ml volume corresponded to a collection of approximately 4.4 canister volumes, whereas the 800 ml corresponded to approximately 1.1 canister volumes collected. Since a degree of contamination of the collection matrix will ensue during magnetic separation processing, it is to be expected—as is borne out be examination of the tabularized data—that where the volume of slurry collected is less, i.e. for the 800 ml case, that the titania will be more effectively removed. In all instances the data in this Example reflects a retention time in the field of 43 seconds.

Table II

| Volume Collected | Field (KG) | TiO₂ % |
|---|---|---|
| | 0.64 | 0.78 |
| | 1.6 | 0.56 |
| | 2.3 | 0.45 |
| | 3.9 | 0.42 |
| 800 ml | 6.1 | 0.35 |
| | 8.3 | 0.29 |
| | 12.2 | 0.31 |
| | 18.1 | 0.20 |
| | .64 | 0.94 |

Table II-continued

| Volume Collected | Field (KG) | TiO₂ % |
|---|---|---|
| | 1.6 | 0.60 |
| | 2.3 | 0.50 |
| | 3.9 | 0.48 |
| 3200 ml | 6.1 | 0.40 |
| | 8.3 | 0.30 |
| | 12.2 | 0.31 |
| | 18.1 | 0.28 |

EXAMPLE III

In Table III hereinbelow, data is set forth with respect to the aforementioned clay F samples (initial TiO₂ content, 1.66%) which have been processed in accordance with the procedures just described. More specifically, results are tabularized for such samples which are processed in the magnetic separator at 20% w/w solids, and for three different retention times. The samples are further processed both with and without use of the magnetic seeding particulate of the invention, and under various magnetic field intensity conditions. In all instances the results refer to processing of 3200 ml quantities of slurry—corresponding to approximately 4.4 canister volumes. The efficacy with which the titania is being separated by practice of the invention will be evident.

Table III

| Retention Time | Field (KG) | With Magnetic Seeding Particulate TiO₂ % | Without Magnetic Seeding Particulate TiO₂ % |
|---|---|---|---|
| | 0.64 | 0.29 | — |
| | 1.6 | 0.27 | 1.20 |
| | 2.3 | 0.09 | — |
| 127 sec. | 3.9 | 0.07 | 1.12 |
| | 6.1 | 0.06 | — |
| | 8.3 | 0.06 | 1.06 |
| | 12.2 | 0.05 | — |
| | 18.1 | 0.05 | .98 |
| | 0.64 | 0.30 | 0.98 |
| | 1.6 | 0.20 | 1.29 |
| | 2.3 | 0.13 | — |
| 62 sec. | 3.9 | 0.09 | 1.15 |
| | 6.1 | 0.08 | — |
| | 8.3 | 0.07 | 1.10 |
| | 12.2 | 0.06 | — |
| | 18.1 | 0.06 | 1.02 |
| | 0.64 | 0.40 | — |
| | 1.6 | 0.35 | 1.38 |
| | 2.3 | 0.28 | — |
| 43 sec. | 3.9 | 0.24 | 1.29 |
| | 6.1 | 0.14 | — |
| | 8.3 | 0.14 | 1.15 |
| | 12.2 | 0.14 | — |
| | 18.1 | 0.14 | 1.10 |

EXAMPLE IV

In Table IV hereinbelow data is set forth with respect to the aforementioned clay G samples, (initial TiO₂ content, 1.33%) which have been processed in accordance with the previously described procedures. As was the case in Example III, results are now tabulated for clay G samples which are processed in the magnetic separator at 20% w/w solids, and for three different retention times; i.e. at 43, 62 and 127 seconds. The samples are further, processed both with and without use of the magnetic seeding particulate of the invention, and under various magnetic field intensity conditions. In all instances the results refer to processing of 3200 ml quantities of slurry, which corresponds to approximately 4.4 canister volumes.

Table IV

| Retention Time | Field (KG) | With Magnetic Seeding Particulate TiO$_2$ % | Without Magnetic Seeding Particulate TiO$_2$ % |
|---|---|---|---|
| 127 sec. | 0.64 | 0.66 | — |
|  | 1.6 | 0.44 | 1.06 |
|  | 2.3 | 0.34 | — |
|  | 3.9 | 0.30 | 0.88 |
|  | 6.1 | 0.28 | — |
|  | 8.3 | 0.26 | 0.75 |
|  | 12.2 | 0.24 | — |
|  | 18.1 | 0.20 | 0.73 |
| 62 sec. | 0.64 | 0.90 | — |
|  | 1.6 | 0.75 | 1.20 |
|  | 2.3 | 0.57 | — |
|  | 3.9 | 0.48 | 1.06 |
|  | 6.1 | 0.36 | — |
|  | 8.3 | 0.28 | 0.98 |
|  | 12.2 | 0.31 | — |
|  | 18.1 | 0.30 | 0.86 |
| 43 sec. | 0.64 | 1.10 | — |
|  | 1.6 | 0.82 | 1.29 |
|  | 2.3 | 0.78 | — |
|  | 3.9 | 0.60 | 1.24 |
|  | 6.1 | 0.58 | — |
|  | 8.3 | 0.56 | 1.10 |
|  | 12.2 | 0.53 | — |
|  | 18.1 | 0.48 | 0.99 |

EXAMPLE V

Further clay samples of the type F heretofore mentioned, were processed utilizing the method of the present invention, under the following experimental conditions:

Table V

| Magnetic Field | 8 kilogauss |
| Residence Time | 120 seconds |
| Seed Dose Rate | 10 ml/lb. dry clay |
| Canister Volume | 725 cm$^3$ |
| Matrix Packing | 7% v/v |

The co-flocculated metal oxide and seeding particulate retained at the separator matrix was flushed from the matrix with water with the magnetic field extinguished. This "concentrate" was then examined under a transmission electron microscope at various magnifications.

In the resultant electron photo micrograph of FIG. 1, the magnification is 192,000×. The TiO$_2$ particles appear as intensely black, somewhat egg-shaped forms, which in the scale of the photograph have diameters of the order of at least 1 cm or larger. The seeding particles appear as agglomerations of tiny black dots, which in the scale of the photograph are approximately 1 mm or less; the agglomerates of these very small particles appear in the photograph to resemble "frog spawn" or similar groupings of fish eggs. It may be observed from the actual scale provided as part of these photographs, that the ultimate actual dimensions of these seeding particles are indeed (as already mentioned) of the order of 100 Å or so. It can clearly be seen from the photograph of FIG. 1 that the magnetic seeding particles are directly associated with the titania particles.

Figure 2:
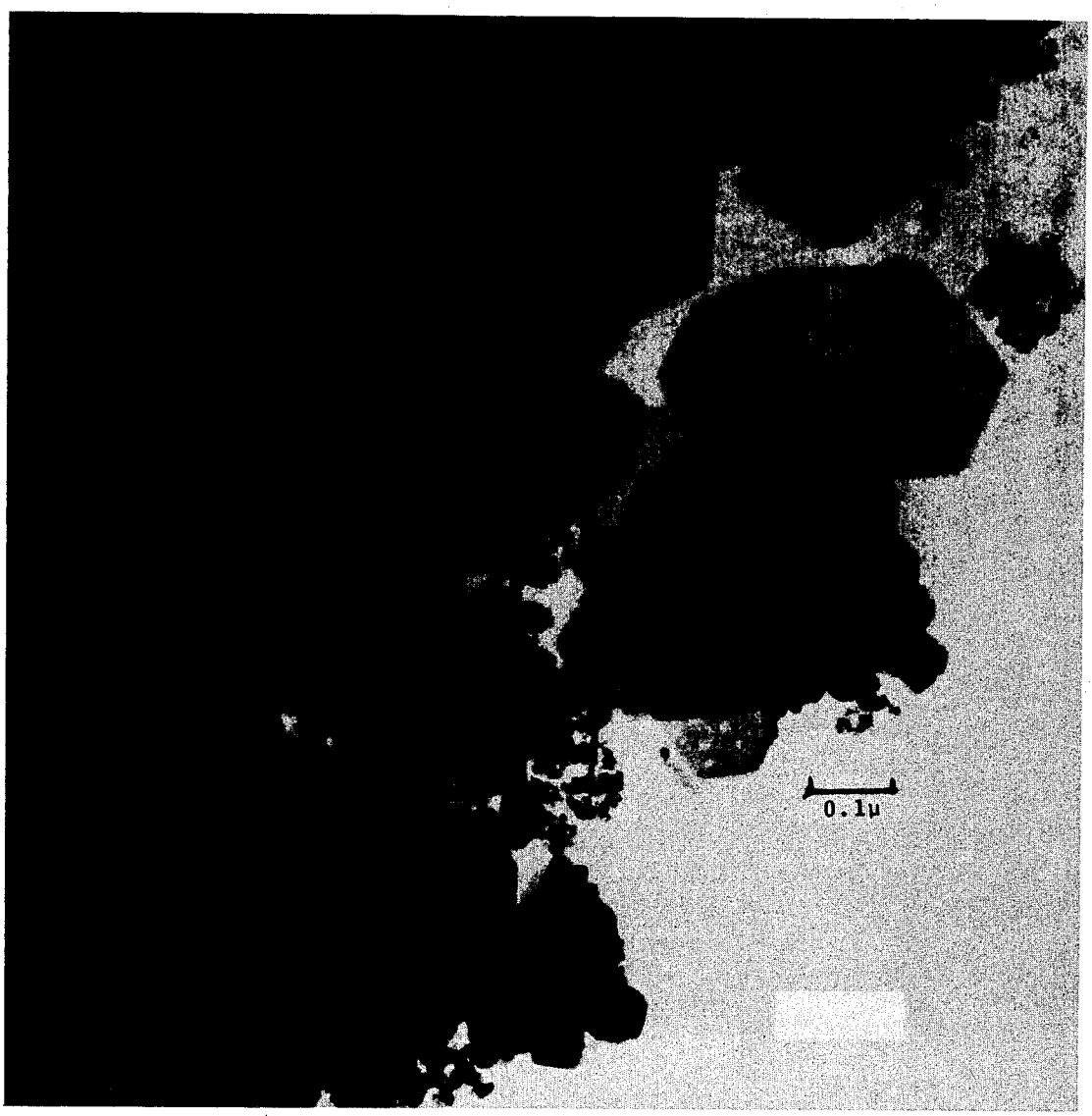

The electron photo micrograph appearing as FIG. 2, was made at a magnification of 154,000×. In this photograph, the clay particles are also clearly seen, which particles appear as light, rather extended hexagonal forms. Those clay particles at the right portion of the photograph e.g. have dimensions (on the scale of the photograph) of approximately 4 cm. This FIG. 2 photograph illustrates the remarkable degree to which the seeding particles have become preferentially associated with, i.e. coflocculated with, the titania particles—to the exclusion of association with the clay particles.

EXAMPLE VI

In this Example ores were initially prepared based upon kaolin clays as the purified product sought to be recovered. Initially a beneficiated kaolin was prepared as follows: A coarse particle size, cream Georgia kaolin crude clay was dispersed, blunged, seeded, diluted to 25% solids, and screened. The resulting slurry was passed through magnetic separating apparatus of the Marston type to remove TiO$_2$. A virtually pure kaolin (TiO$_2$ 0.1%) resulted.

The product from this procedure, was flocced and filtered to 60% solids and the filter cake dispersed with 2 lbs./ton of a sodium polyacrylate/sodium hexametaphosphate mixture (pH adjusted to 7.0 with NH$_4$OH). This dispersed product was then split into six 1 pound (dry weight) batches, each sample being doped with a metal oxide (10 gm) and mixed in a high speed blender for three minutes. The metal oxides are described in the following Table:

Table VI

| No. | Metal | Metal Oxide | Source |
|---|---|---|---|
| 1 | Tin | Tin(II)Oxide(SnO) | Ventron(Alfa Products) |
| 2 | Zirconium | Zirconium Oxide(ZrO$_2$) | Fisher Scientific Co. |
| 3 | Zinc | Zinc Oxide (ZnO) | Fisher Scientific Co. |
| 4 | Chromium | Chromium(III)Oxide Cr$_2$O$_3$ | Ventron(Alfa Products) |
| 5 | Cerium | Ceric Oxide (CeO$_2$) | Fisher Scientific Co. |
| 6 | Titanium | Titanium Dioxide(TiO$_2$) | J.T. Baker Chemical Co. |

Small samples of these doped materials (100 gms) were dried with no further treatment and designated as "Standards" (1 thru 6). The remainder of the samples were diluted to 25% solids and passed through the magnetic separator under the following conditions:

Magnetic Field: 15 kG
Volume Flow Rate: 360 cm$^3$ min-1
Canister Volume/cycle: 2
Residence Time: 120 sec.

The products from the magnetic separator were dried and designated Samples A (1 through 6).

Samples beneficiated using seeded magnetic separation were treated slightly differently. The oxide was added to the kaolin as before but mixed for 2 minutes only. At this point magnetic seed prepared as in Example I was added to the doped slurries (40 ml/4 lbs. dry clay) and mixing continued for a further one minute. The seeded/doped slurries were passed through the magnetic separator using the conditions outlined above. As before, the products were collected, dried and designated Samples B (1 through 6).

Analyses of metal oxides in the samples (Standard, A, and B) were carried out by two methods: (a) X-ray fluorescence; (b) atomic emission spectroscopy. All results are presented in Table VII below, as a function of the quantity of metal oxide in the "Standard" sample—the Standard taken as 100.

Table VII

| No. | Oxide | Std. | XRF | | Atomic Emission | |
| --- | --- | --- | --- | --- | --- | --- |
| | | | A | B | Std. | A | B |
| 1 | SnO | 100 | 11 | 2 | — | — | — |
| 2 | $ZrO_2$ | 100 | 66 | 0 | — | — | — |
| 3 | ZnO | 100 | 56 | 9 | 100 | 37 | 5 |
| 4 | $Cr_2O_3$ | 100 | 8 | 6 | — | — | — |
| 5 | $CeO_2$ | 100 | — | — | 100 | 39 | 6 |
| 6 | $TiO_2$ | 100 | 85 | 3 | 100 | 95 | 11 |

While there is some variation in the results obtained using the two measurement techniques, it is eminently clear that the seeded magnetic separation is far superior to conventional magnetic separation for the zirconium, zinc, cerium, and titanium oxides.

EXAMPLE VII

The procedures set forth in Example VI were repeated, using however ground calcium carbonate as the ore material in place of kaolin. Average results for $TiO_2$ content as yielded by x-ray fluorescence analysis were as follows:

Table VIII

| Standard | : | 1.31% | $TiO_2$ |
| --- | --- | --- | --- |
| Conventional Magnetic Separation | : | 0.73% | $TiO_2$ |
| Seeded Magnetic Separation | : | 0.42% | $TiO_2$ |

While the present invention has been particularly set forth in terms of specific embodiments thereof, it will be understood in view of the instant disclosure, that numerous variations upon the invention yet reside within the scope of the present teaching. Accordingly the invention is to be broadly construed, and limited only by the scope and spirit of the claims now appended hereto.

We claim:

1. A method for magnetically beneficiating an ore by separating therefrom an inorganic metal oxide of inherently low magnetic attractability which is present in said ore as an undesired species, comprising:
   forming a dispersed aqueous slurry of said ore including said metal oxide;
   mixing said slurry with a system of transiently suspended ferrimagnetic particles of predominantly colloidal size, said particles being further characterized by an isoelectric point in relation to the metal oxide sought to be separated, such that said particles spontaneously co-flocculate with said oxide to seed same;
   passing the resultant seeded slurry through a porous ferromagnetic matrix in the presence of a magnetic field, to separate said seeded metal oxide at said matrix; and recovering as product the beneficiated ore emerging from said matrix.

2. A method in accordance with claim 1, wherein said seeding particles have an isoelectric point within 2.0 units of that of said metal oxide.

3. A method in accordance with claim 2, wherein the pH in said seeded slurry is between the isoelectric points of said seeding particles and said metal oxide.

4. A method in accordance with claim 2, wherein said particles comprise ferroso-ferric oxide.

5. A method in accordance with claim 4, wherein said particles are added to said slurry as a system comprising the product of aqueous coprecipitation of iron (III) with iron (II) salts in the presence of an excess of a strong base.

6. A method in accordance with claim 2, wherein said particles comprise a magnetic ferrite of the general formula $MO.Fe_2O_3$, where M is a divalent metal ion.

7. A method in accordance with claim 6, wherein said particles are added to said slurry as a particulate which is the product of aqueous coprecipitation of an iron (III) salt with the salt of said divalent metal in the presence of an excess of a strong base.

8. A method in accordance with claim 7, wherein M is selected from one or more members of the group consisting of iron, nickel, cobalt, manganese, and magnesium.

9. A method in accordance with claim 1, wherein said magnetic field is as low as 0.5 kilogauss.

10. A method in accordance with claim 1, wherein said matrix comprises steel wool.

* * * * *